US012597821B2

(12) United States Patent     (10) Patent No.:   US 12,597,821 B2

Hattori               (45) Date of Patent:        Apr. 7, 2026

(54) ROTARY ELECTRIC MACHINE

(71) Applicant: TOYOTA JIDOSHA KABUSHIKI KAISHA, Toyota (JP)

(72) Inventor: Hiroyuki Hattori, Okazaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 147 days.

(21) Appl. No.: 18/515,453

(22) Filed: Nov. 21, 2023

(65) Prior Publication Data

US 2024/0223039 A1      Jul. 4, 2024

(30) Foreign Application Priority Data

Dec. 28, 2022    (JP) ................................. 2022-212277

(51) Int. Cl.
     *H02K 3/47*        (2006.01)
     *H02K 3/28*        (2006.01)

(52) U.S. Cl.
     CPC ................. *H02K 3/47* (2013.01); *H02K 3/28* (2013.01)

(58) Field of Classification Search
     CPC ...... H02K 21/14; H02K 2213/03; H02K 3/04; H02K 3/28; H02K 3/47
     See application file for complete search history.

(56) References Cited

U.S. PATENT DOCUMENTS

| | | | |
|---|---|---|---|
| 2013/0009523 A1 | 1/2013 | Takeuchi | |
| 2013/0285502 A1* | 10/2013 | Clark ................... | H02K 15/063 310/208 |
| 2021/0249922 A1* | 8/2021 | Takahashi ................ | H02K 1/28 |
| 2021/0288531 A1* | 9/2021 | Takahashi .............. | H02K 21/22 |

FOREIGN PATENT DOCUMENTS

| | | | |
|---|---|---|---|
| JP | 2012249389 A | * | 12/2012 |
| JP | 2013-017341 A | | 1/2013 |

OTHER PUBLICATIONS

JP-2012249389-A, all pages (Year: 2012).*

* cited by examiner

*Primary Examiner* — Naishadh N Desai

(74) *Attorney, Agent, or Firm* — SoraIP, Inc.

(57)        ABSTRACT

A rotary electric machine includes a stator including a stator core and stator coils, which is cylindrical centered on an axis and has no slots, and a rotor disposed radially inward of the stator and including a rotor core and permanent magnets. (a) The stator coil is fixed to the inner peripheral surface inside the stator core. (b) The stator coil has coil end portions protruding outward from both end portions of the stator core in the direction of the axis CL. (c) In the direction of the axis CL, the length of the rotor core and the permanent magnets is longer than the length of the stator core, and the rotor core and the permanent magnets are arranged at positions including the stator core.

7 Claims, 4 Drawing Sheets

ROTARY ELECTRIC MACHINE

CROSS-REFERENCE TO RELATED APPLICATION

This application claims priority to Japanese Patent Application No. 2022-212277 filed on Dec. 28, 2022, incorporated herein by reference in its entirety.

BACKGROUND

1. Technical Field

The present disclosure relates to a rotary electric machine including a stator core, a stator, and a rotor. The stator core is not provided with slots. The stator includes stator coils. The rotor is disposed radially inward of the stator.

2. Description of Related Art

In the axial direction, the end of a rotor core includes an overhanging portion that protrudes further outward than the end of the stator core. An embedded magnet type rotary electric machine is known in which the outer peripheral surface of the overhanging portion of the rotor core is recessed in the axial direction from the outer peripheral surface other than the overhanging portion in the axial direction. For example, the rotary electric machine is described in Japanese Unexamined Patent Application Publication No. 2012-249389 (JP 2012-249389 A). In the rotary electric machine described in JP 2012-249389 A, the lengths of the permanent magnets embedded in the outer peripheral portion of the rotor core are substantially the same as the length of the inner peripheral portion of the stator core in the axial direction. By providing the overhanging portion, the distance between the outer peripheral surface of the rotor core and the inner peripheral surface of the stator core is secured. Therefore, the magnetic resistance is increased. The increase in the magnetic resistance suppresses the flow of magnetic flux from the overhanging portion of the rotor core to the inner peripheral portion of the stator core. In this way, attempts have been made to improve the output efficiency while reducing the eddy current loss by adopting a novel shape of the rotor.

SUMMARY

By the way, in order to realize the rotary electric machine described in JP 2012-249389 A, it is necessary to set the lengths of the permanent magnets embedded in the rotor core and the length of the stator core to substantially the same length in the axial direction. Therefore, the axial length of the rotary electric machine is increased by the overhanging portion. As a result, the physical size of the rotary electric machine becomes large. For example, when such a rotary electric machine is a driving power source for a vehicle such as a hybrid electric vehicle or a battery electric vehicle, there is a risk that the mounting of the rotary electric machine on the vehicle will deteriorate.

The present disclosure has been made in view of the above circumstances. An object of the present disclosure is to provide a rotary electric machine capable of suppressing the physical size of the rotary electric machine and improving the output performance thereof.

The gist of the present disclosure is a rotary electric machine including a stator including a stator coil and a stator core that has a cylindrical shape centered on an axis and does not include a slot, and a rotor that is disposed radially inward of the stator and includes a rotor core and a permanent magnet. (a) The stator coil is fixed inside the stator core. (b) In a direction of the axis, the stator coil includes a protrusion that protrudes outward from both ends of the stator core. (c) In the direction of the axis, lengths of the rotor core and the permanent magnet are longer than a length of the stator core, and the rotor core and the permanent magnet are disposed at positions including the stator core.

According to the rotary electric machine of the present disclosure, (a) The stator coil is fixed inside the stator core.

(b) In a direction of the axis, the stator coil includes a protrusion that protrudes outward from both ends of the stator core.

(c) In the direction of the axis, lengths of the rotor core and the permanent magnet are longer than a length of the stator core, and the rotor core and the permanent magnet are disposed at positions including the stator core.

For example, when the rotary electric machine is used as an electric motor, torque is generated by interlinkage of magnetic flux flowing from the rotor to portions of the stator coil other than the protrusion. Furthermore, torque is also generated by interlinkage of magnetic flux flowing from the rotor to the protrusion. As a result, when the lengths of the rotor core and the permanent magnet are longer than the length of the stator core in the direction of the axis CL and the rotor core and the permanent magnet are disposed at a position including the stator core, it is possible to suppress the physical size of the rotary electric machine and improve the output performance thereof as compared with a case where the lengths of the rotor core and the permanent magnet are not longer than the length of the stator core in the direction of the axis CL and the rotor core and the permanent magnet are not disposed at a position including the stator core.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. In the examples, the drawings are appropriately simplified or modified, and the dimensional ratios, shapes, etc. of each part are not necessarily drawn accurately. In this specification, the "direction parallel to the axis CL", the "circumferential direction of the stator 20 (=the circumferential direction of the rotor 40)", and the "radial direction of the stator 20 (=the radial direction of the rotor 40)" are simply referred to as The terms "axis CL direction", "circumferential direction", and "radial direction" are used.

Figure 1:
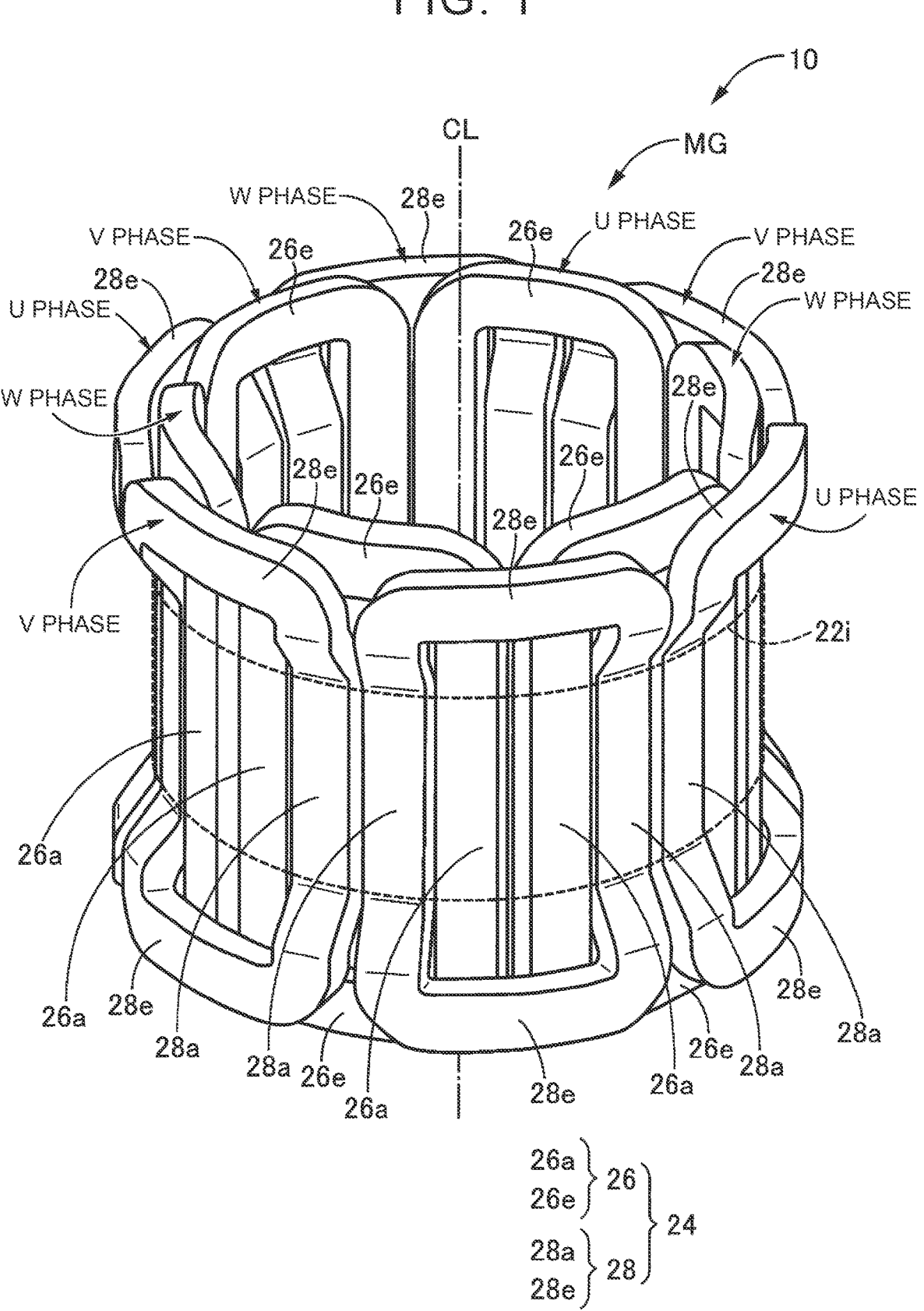
FIG. 1 is a perspective view of a stator coil of a rotary electric machine.

FIG. 1 is a perspective view of the stator coil 24 of the rotary electric machine MG. In FIG. 1, only the winding portion of the stator coil 24 is illustrated. The rotary electric machine MG includes a cylindrical stator 20 (see FIG. 4) centered on an axis CL, which is the centerline of rotation, and a rotor 40 (see FIG. 4) arranged radially inward of the stator 20. The rotary electric machine MG is a driving power source mounted on a vehicle 10 such as a hybrid electric vehicle or a battery electric vehicle. The rotary electric machine MG is, for example, a three-phase synchronous motor. The rotary electric machine MG is, for example, a so-called motor generator, which is a rotary electric machine having a motor function and a generator function.

The stator 20 includes a cylindrical stator core 22 (see FIG. 4) centered on the axis CL and a stator coil 24. No slots are provided on the inner peripheral surface 22i of the cylindrical stator core 22. The slot has a depth in the radial direction on the inner peripheral surface 22i of the stator core 22 toward the outer peripheral side. Moreover, the slot is a groove that penetrates in the direction of the axis CL. As will be described later, the stator coil 24 is fixed to the inner peripheral surface 22i of the stator core 22.

As shown in FIG. 1, the stator coil 24 includes the same number of first coils 26 arranged in an annular shape and the same number of second coils 28 arranged in an annular shape. A coil end portion 26e of the first coil 26 is located on the inner peripheral side of the coil end portion 28e of the second coil 28. In other words, the stator coil 24 is double annularly arranged on the radially inner and outer peripheral sides of the coil end portions 26e and 28e. The coil end portion 26e and the coil end portion 28e will be described later. In this embodiment, the number of the first coils 26 and the number of the second coils 28 is six. The first coil 26 and the second coil 28 are air-core coils having air-core portions. The air core portion is a space surrounded by the winding portions of the first coil 26 and the second coil 28 and in which no ferromagnetic material is arranged. These first coil 26 and second coil 28 are electrically insulated from each other.

The first coil 26 and the second coil 28 have different shapes. The first coils 26 each have a pair of straight portions 26a. The pair of straight portions 26a extends along the inner peripheral surface 22i of the stator core 22 and in the direction of the axis CL. The second coils 28 each have a pair of straight portions 28a. The pair of straight portions 28a extends along the inner peripheral surface 22i of the stator core 22 and in the direction of the axis CL. Air core portions are provided between the pair of straight portions 26a and between the pair of straight portions 28a. A pair of straight portions 28a of the second coil 28 is arranged in air core portions of two first coils 26 adjacent in the circumferential direction. As a result, the pair of straight portions 26a of the first coil 26 are arranged in the air core portions of the two second coils 28 adjacent in the circumferential direction. The "pair of straight portions 26a" and the "pair of straight portions 28a" respectively correspond to the "pair of first straight portions" and the "pair of second straight portions" in the present disclosure.

Each of the first coils 26 has a projecting portion and a coil end portion 26e. The projecting portion extends outward from the end portion of the stator core 22 in the direction of the axis CL from the pair of straight portions 26a. The coil end portion 26e includes an arcuate portion in which tip portions of the projecting portions are electrically connected to each other. "Outward" means a direction away from the rotary electric machine MG. Each of the second coils 28 includes a portion bent radially outward and a coil end portion 28e. The bent portion is a portion protruding outward from the pair of straight portions 28a beyond the ends of the stator core 22 in the direction of the axis CL. The coil end portion 28e includes an arcuate portion in which tip portions of the projecting portions are electrically connected to each other. The coil end portions 26e and 28e are located on both the one end portion 22t1 (see FIG. 4) side and the other end portion 22t2 (see FIG. 4) side of the stator core 22 in the direction of the axis CL. "One end portion 22t1 and the other end portion 22t2" correspond to "both ends" in the present disclosure. The "coil end portions 26e, 28e" respectively correspond to the "protrusions" in the present disclosure.

In the stator coil 24, for example, a first coil 26 and a second coil 28 are assigned in order as U-phase, V-phase, and W-phase coils in the circumferential direction. The U-phase coils, the V-phase coils, and the W-phase coils are electrically connected in parallel or in series.

Figure 2:
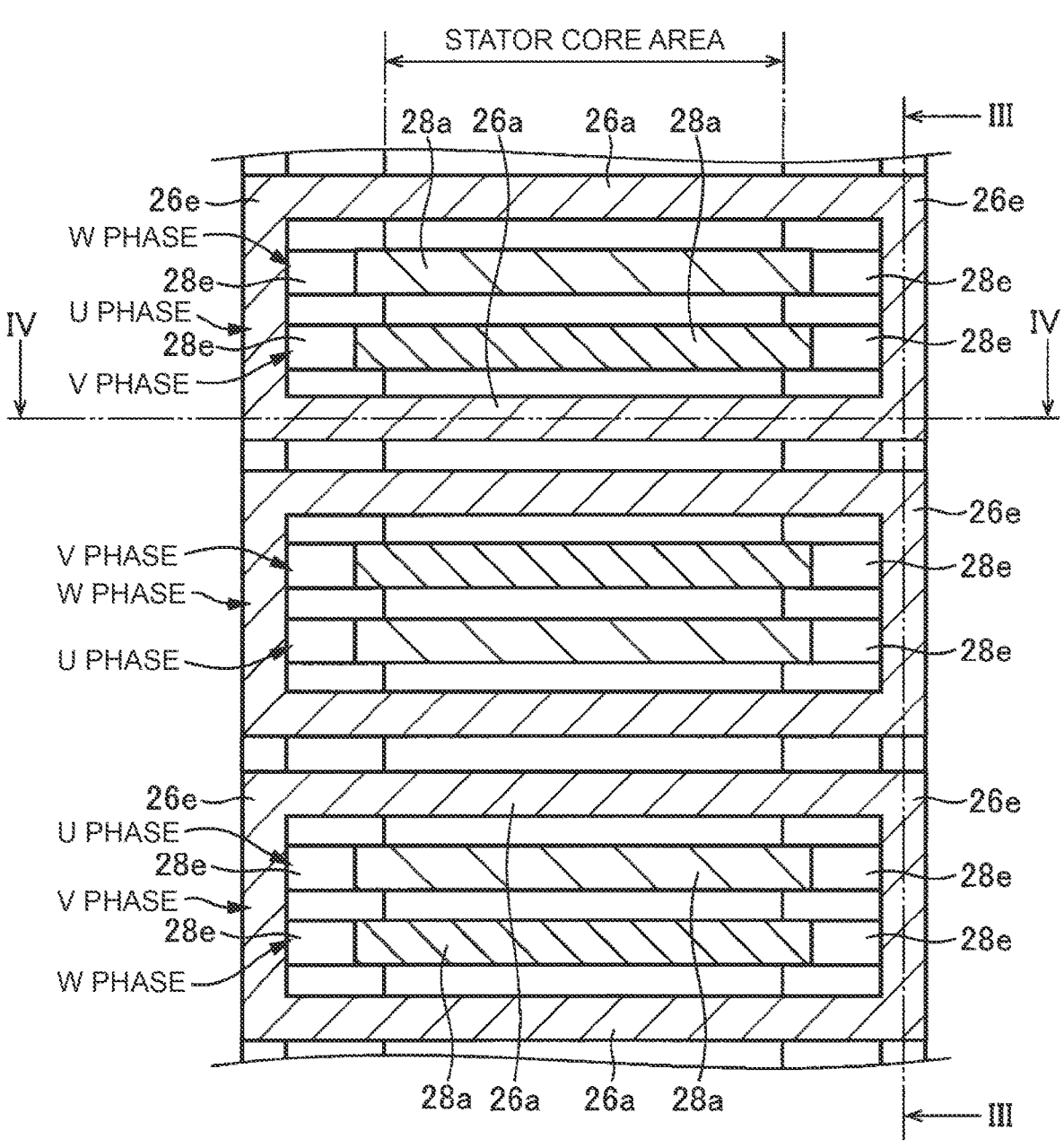
FIG. 2 is a diagram of a stator of a rotary electric machine, which is partially developed in the circumferential direction on a plane and viewed from the axial side to the radially outer peripheral side.
Figure 3:
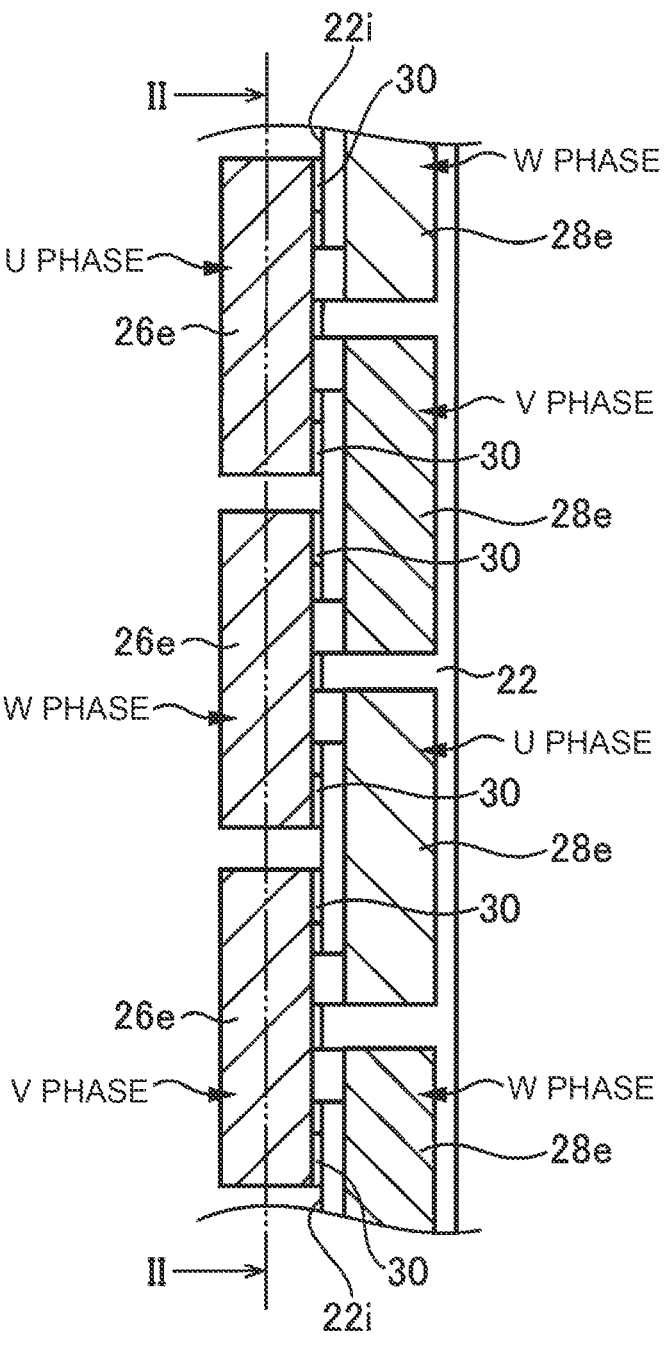
FIG. 3 is a cross-sectional view of a stator of a rotary electric machine, partly developed in the circumferential direction on a plane and cut in the radial direction.

FIG. 2 is a view of the stator 20 of the rotary electric machine MG, which is partially developed in the circumferential direction on a plane and viewed from the side of the axis CL to the outer peripheral side in the radial direction. FIG. 2 is a cross-sectional view taken along a cutting line II-II shown in FIG. 3 which will be described later. FIG. 3 is a cross-sectional view of the stator 20 of the rotary electric machine MG, which is partially expanded in the circumferential direction and cut in the radial direction. FIG. 3 is a cross-sectional view cut along the cutting line III-III shown in FIG. 2.

As described above, the pair of straight portions 28a of the second coil 28 are arranged in the air core portions of the two first coils 26 adjacent in the circumferential direction. A pair of straight portions 26a of the first coil 26 are arranged in air core portions of two second coils 28 adjacent in the circumferential direction. The inner peripheral surface 22i of the stator core 22 and the outer peripheral side of the pair of straight portions 28a of the first coil 26 and the outer peripheral side of the pair of straight portions 28a of the second coil 28 are fixed with an adhesive 30, for example. That is, the stator coil 24 is fixed inside the stator core 22.

In the first coil 26, the region of the air core that faces the stator core 22 in the radial direction is referred to as the "stator core facing region" of the first coil 26. In the first coil 26, the region other than the "stator core facing region" in the air core portion is referred to as the "stator core non-facing region" of the first coil 26. Similarly, in the second coil 28, the region of the air core that faces the stator core 22 in the radial direction is referred to as the "stator core facing region" of the second coil 28. In the second coil 28, the region other than the "stator core facing region" in the air core portion is referred to as the "stator core non-facing region" of the second coil 28. Circumferentially adjacent first coils 26 and second coils 28 are in a state in which their "stator core facing regions" partially overlap each other in the circumferential direction.

Figure 4:
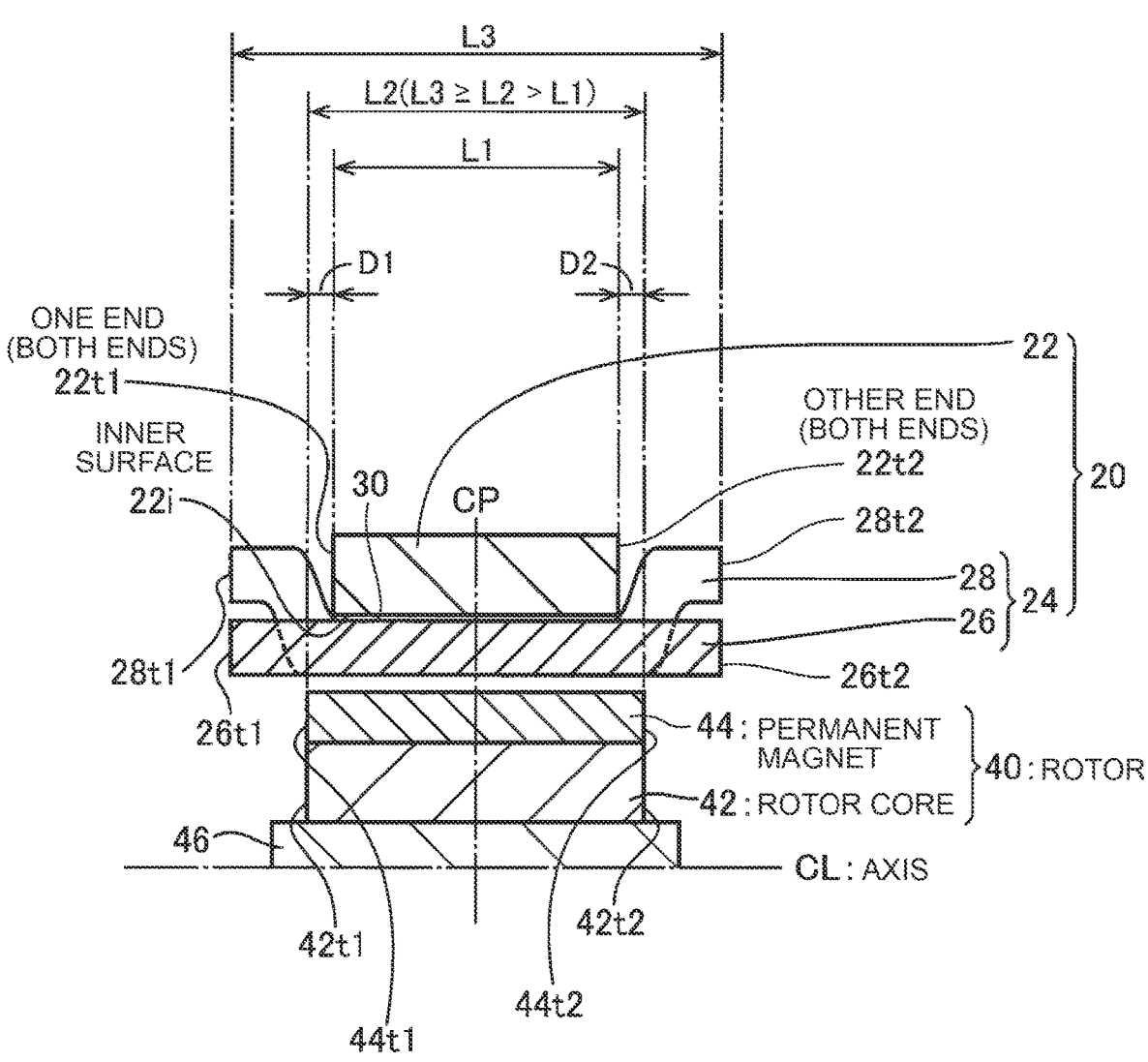
FIG. 4 is a cross-sectional view of the rotary electric machine cut in the axial direction.

FIG. 4 is a cross-sectional view of the rotary electric machine MG cut in the direction of the axis CL. FIG. 4 is a cross-sectional view cut along the cutting line IV-IV shown in FIG. 2. The rotary electric machine MG is configured substantially symmetrically with respect to the axis CL, and the lower half of the axis CL is omitted in FIG. 4.

A rotor 40 is provided radially inward of the stator coil 24. The rotor 40 includes a cylindrical rotor core 42 centered on the axis CL and permanent magnets 44. The permanent magnets 44 are fixed to the outer peripheral surface of the rotor core 42 with an adhesive 30, for example. The rotor 40 is a surface magnet rotor. The permanent magnets 44 are arranged side by side in the circumferential direction so that their N poles and S poles alternately face the stator 20. A rotor shaft 46 is inserted through a hollow portion on the inner peripheral side of the rotor core 42. One end portion 42t1 of the rotor core 42 and one end 44t1 of the permanent magnet 44 extend to the same position in the direction of the axis CL. The other end 42t2 of the rotor core 42 and the other end 44t2 of the permanent magnet 44 extend to the same position in the direction of the axis CL.

The center position of the stator core 22, the rotor core 42, and the permanent magnets 44 in the direction of the axis CL is a common position CP (hereinafter referred to as "center position CP").

In the direction of the axis CL, the length L2 [mm] of the rotor core 42 and the permanent magnets 44 is longer than the length L1 [mm] of the stator core 22 (L2>L1). Also, the rotor core 42 and the permanent magnets 44 are arranged at positions including the stator core 22. That is, in the direction of the axis CL, the one end portion 22t1 of the stator core 22 is at the same position as the one end portion 42t1 of the rotor core 42 or at a position closer to the center position CP than the one end portion 42t1. In the direction of the axis CL, the other end portion 22t2 of the stator core 22 is at the same position as the other end 42t2 of the rotor core 42 or at a position closer to the center position CP than the other end 42t2. In the direction of the axis CL, the one end portion 22t1 of the stator core 22 is at the same position as the one end 44t1 of the permanent magnet 44 or at a position closer to the center position CP than the one end 44t1. In the direction of the axis CL, the other end portion 22t2 of the stator core 22 is at the same position as the other end 44t2 of the permanent magnet 44 or at a position closer to the center position CP than the other end 44t2.

Thus, the length L2 of the rotor core 42 and the permanent magnets 44 is longer than the length L1 of the stator core 22 in the direction of the axis CL, and the rotor core 42 and the permanent magnets 44 are arranged at positions including the stator core 22. Accordingly, when viewed in the radial direction, the rotor core 42 and the permanent magnets 44 are arranged so as to overlap the entire "stator core facing region" of the first coil 26 and the second coil 28. In addition, when viewed in the radial direction, the rotor core 42 and the permanent magnets 44 are placed overlapping each other at "stator core non-facing regions" of the first coil 26 and the second coil 28 on at least one side of their one end portions 42t1, 44t1 and the other end portions 42t2, 44t2.

In the direction of the axis CL, one end 42t1 of the rotor core 42 and one end 44t1 of the permanent magnet 44 extend outward from the one end portion 22t1 of the stator core 22 by an extension amount D1 [mm]. In the direction of the axis CL, the other end 42t2 of the rotor core 42 and the other end 44t2 of the permanent magnet 44 extend outward from the other end portion 22t2 of the stator core 22 by an extension amount D2 [mm]. Preferably, the extension amount D1 and the extension amount D2 are the same. The term "same" as used herein means substantially the same, and specifically means the same within the range of design tolerance. When the extension amount D1 and the extension amount D2 are the same, the thrust force applied to the rotor 40 in the direction of the axis CL is suppressed as compared to the other case.

In the direction of the axis CL, the length L2 of the rotor core 42 and the permanent magnets 44 is equal to or less than the length L3 [mm] of the stator coil 24 (L2≤L3). The length L2 of the rotor core 42 and permanent magnets 44 may be the same as the length L3 of the stator coil 24. FIG. 4 illustrates the case where the length L2 of the rotor core 42 and the permanent magnets 44 is shorter than the length L3 of the stator coil 24 in the direction of the axis CL.

The stator coil 24 is arranged at a position including the rotor core 42 and the permanent magnets 44 in the direction of the axis CL. That is, in the direction of the axis CL, the one end portion 42t1 of the rotor core 42 is located at the same position as the one end portion 24t1 of the stator coil 24 (=the one end portion 26t1 of the first coil 26 and the one end portion 28t1 of the second coil 28) or is located closer to the center position CP than the one end portion 24t1. In the direction of the axis CL, the other end 42t2 of the rotor core 42 is located at the same position as or at the other end portion 24t2 of the stator coil 24 (=the other end portion 2612 of the first coil 26 and the other end 28t2 of the second coil 28). This position is closer to the center position CP than the other end portion 24t2. In the direction of the axis CL, the one end 44t1 of the permanent magnet 44 is at the same position as the one end portion 24t1 of the stator coil 24 or at a position closer to the center position CP than the one end portion 24t1. In the direction of the axis CL, the other end 44t2 of the permanent magnet 44 is at the same position as the other end portion 24t2 of the stator coil 24 or at a position closer to the center position CP than the other end portion 24t2.

Thus, the stator coil 24 is arranged at a position including the rotor core 42 and the permanent magnets 44 in the direction of the axis CL. Therefore, the physical size of the rotary electric machine MG in the direction of the axis CL is determined by the length L3 of the stator coil 24.

According to this embodiment, (a) the stator coil 24 is fixed to the inner peripheral surface 22i of the stator core 22. (b) In the direction of the axis CL, the first coil 26 and the second coil 28 have coil end portions 26e and 28e that protrude outward from both end portions 22t1 and 22t2 of the stator core 22, respectively. (c) The length L2 of the rotor core 42 and the permanent magnets 44 is longer than the length L1 of the stator core 22 in the direction of the axis CL, and the rotor core 42 and the permanent magnets 44 are arranged at positions including the stator core 22. For example, when the rotary electric machine MG is used as an electric motor, torque is generated by the magnetic flux flowing from the rotor 40 interlinking with portions of the stator coil 24 other than the coil end portions 26e and 28e (specifically, "stator core facing regions"). Further, torque is also generated by the interlinking of magnetic fluxes flowing from the rotor 40 to the coil end portions 26e and 28e (specifically, the "stator core non-facing regions"). Accordingly, when the length L2 of the rotor core 42 and the permanent magnets 44 is longer than the length L1 of the stator core 22 in the direction of the axis CL and the rotor core 42 and the permanent magnets 44 are arranged at a position including the stator core 22, Compared to the case where this is not the case, the physique of the rotary electric machine MG can be suppressed and the output performance can be improved. For example, compared to the case where the length L1 of the stator core 22 in the direction of the axis CL is the same as the length L2 of the rotor core 42 and the permanent magnets 44 and the extension amounts D1 and D2 are zero values, by shortening the lengths L1 and L3 while keeping the length L2 the same, it is possible to reduce the size of the rotary electric machine MG in the direction of the axis CL while suppressing deterioration in the output performance of the rotary electric machine MG. For example, it is possible to improve the output performance of the rotary electric machine MG by keeping the length L1 and the length L3 the same and increasing the length L2 as compared with a case where the length L1 of the stator core 22 is the same as the length L2 of the rotor core 42 and the permanent magnet 44 and the extension amounts D1 and D2 are zero values in the direction of the axis CL.

According to this embodiment, the stator coil 24 is arranged at a position including the rotor core 42 and the permanent magnets 44 in the direction of the axis CL. When the stator coil 24 is arranged at a position including the rotor core 42 and the permanent magnets 44 in the direction of the axis CL, the size of the rotary electric machine MG in the direction of the axis CL is determined by the length L3 of the stator coil 24. Therefore, when the stator coil 24 is arranged at a position including the rotor core 42 and the permanent magnets 44 in the direction of the axis CL, the size of the rotary electric machine MG in the direction of the axis CL is not increased as compared with the case where it is not. The output performance of the rotary electric machine MG can be improved.

According to this embodiment, (a) the stator coil 24 includes the same number of first coils 26 arranged in an annular shape and the same number of second coils 28 arranged in an annular shape. The coil end portions 26e of the first coil 26 are located on the inner peripheral side of the coil end portions 28e of the second coil 28, respectively. (b) The first coil 26 has a pair of straight portions 26a extending along the inner peripheral surface 22i of the stator core 22 and in the direction of the axis CL. (c) The second coil 28 has a pair of straight portions 28a extending along the inner peripheral surface 22i of the stator core 22 and in the direction of the axis CL. (d) The pair of straight portions 28a of the second coil 28 are arranged in the air core, which is the space between the pair of straight portions 26a of the two first coils 26 adjacent in the circumferential direction. Coil end portions 28e of the second coil 28 are bent radially outward from both end portions 22t1 and 22t2 of the stator core 22, respectively. The coil end portions 26e of the first coil 26 have portions extending outward from the pair of straight portions 26a in the direction of the axis CL so that the coil end portions 28e of the second coil 28 can be bent. Therefore, each of the first coil 26 and the second coil 28 necessarily has a "stator core non-facing region". As a result, even when the stator coil 24 includes the first coil 26 and the second coil 28, the magnetic fluxes flowing from the rotor 40 interlink with the coil end portions 26e and 28e to generate torque. Therefore, it is possible to suppress the physical size of the rotary electric machine MG and improve the output performance.

Although the examples of the present disclosure have been described in detail with reference to the drawings, the present disclosure also applies to other modes.

In the above-described embodiment, the stator coil 24 is fixed to the inner peripheral surface 22i of the stator core 22 with the adhesive 30. However, the present disclosure is not limited to this aspect. For example, by fixing the coil end portions 26e and 28e to the one end portion 22t1 and the other end portion 22t2 of the stator core 22 by resin molding (for example, molding) using a thermosetting resin, the stator coil 24 is positioned inside the stator core 22. It may be fixed.

In the above-described embodiment, the stator coil 24 is provided with the first coil 26 and the second coil 28. However, the present disclosure is not limited to this aspect. For example, the stator coil 24 may have only one of the first coil 26 and the second coil 28. In the case of this embodiment, no other coil is arranged in each air core portion of each coil in the stator coil 24, and the stator coil 24 is not arranged in a double ring but is single.

In the above-described embodiment, the positions of the centers of the stator core 22, the rotor core 42, and the permanent magnets 44 in the direction of the axis CL are the common center position CP. However, the present disclosure is not limited to this. For example, the positions of the centers of the stator core 22, the rotor core 42, and the permanent magnets 44 may be shifted from each other.

In the above-described embodiment, the extension amounts D1 and D2 by which the rotor core 42 and the permanent magnets 44 extend from both end portions 22t1 and 22t2 of the stator core 22 are the same in the direction of the axis CL. However, the present disclosure is not limited to this aspect. For example, even if the extension amounts D1 and D2 are different, the magnetic flux flowing from the rotor 40 interlinks with the coil end portions 26e and 28e to generate torque and improve the output performance of the rotary electric machine MG can be done.

In the embodiment described above, the length L2 of the rotor core 42 and the permanent magnets 44 in the direction of the axis CL is less than or equal to the length L3 of the stator coil 24. However, the present disclosure is not limited to this aspect. For example, even if the length L2 of the rotor core 42 and the permanent magnets 44 exceeds the length L3 of the stator coil 24, the magnetic flux that flows from the rotor 40 interlinks with the coil end portions 26e and 28e to generate torque, and the output performance of the rotary electric machine MG can be improved.

The embodiment described above is a surface magnet type rotor in which the permanent magnets 44 are fixed to the outer peripheral surface of the rotor core 42. However, the present disclosure is not limited to this aspect. For example, the present disclosure can also be applied to an embedded magnet type rotor in which permanent magnets 44 are embedded inside the rotor core 42.

It should be noted that what has been described above is merely an embodiment of the present disclosure, and the present disclosure can be carried out with various modifications and improvements based on the knowledge of those skilled in the art without departing from the scope of the disclosure.

What is claimed is:

1. A rotary electric machine comprising:
   a stator including a stator coil and a stator core that has a cylindrical shape centered on an axis, the stator coil being fixed to an inner peripheral surface of the stator core, and
   a rotor that is disposed radially inward of the stator and includes a rotor core and a permanent magnet, wherein:
   in a direction of the axis, the stator coil includes a protrusion that protrudes outward from both ends of the stator core;
   a center of the stator core, a center of the permanent magnet, and a center of the rotor core are aligned along a same center line as viewed in a radial direction of the stator core, the permanent magnet, and the rotor core in which the axis serves as a center; and
   in the direction of the axis, a length of the rotor core is equal to a length of the permanent magnet, and the length of the permanent magnet is longer than a length of the stator core.

2. The rotary electric machine according to claim 1, wherein:
   the stator coil includes the same number of a plurality of first coils arranged in an annular shape and a plurality of second coils arranged in an annular shape, and the protrusion of each of the first coils is positioned radially inward of the protrusion of each of the second coils;

each of the first coils includes a pair of first straight portions extending along the inner peripheral surface of the stator core and extending in the direction of the axis;

each of the second coils includes a pair of second straight portions extending along the inner peripheral surface of the stator core and extending in the direction of the axis;

the pair of second straight portions of the second coil are disposed in respective spaces between the pair of first straight portions of two first coils that are adjacent in a circumferential direction;

the first straight portions and the second straight portions are fixed to the inner peripheral surface of the stator core with an adhesive;

the protrusions of the first coils are electrically connected to each other; and the protrusions of the second coils are electrically connected to each other.

3. The rotary electric machine according to claim 1, wherein:

the stator coil includes the same number of a plurality of first coils arranged in an annular shape and a plurality of second coils arranged in an annular shape, and the protrusion of each of the first coils is positioned radially inward of the protrusion of each of the second coils;

each of the first coils includes a pair of first straight portions extending along the inner peripheral surface of the stator core and extending in the direction of the axis;

each of the second coils includes a pair of second straight portions extending along the inner peripheral surface of the stator core and extending in the direction of the axis;

the pair of second straight portions of the second coil are disposed in respective spaces between the pair of first straight portions of two first coils that are adjacent in a circumferential direction; and the first straight portions and the second straight portions are fixed to the inner peripheral surface of the stator core with an adhesive.

4. The rotary electric machine according to claim 1, wherein the protrusion of the stator coil is fixed to the end of the stator core by a thermosetting resin.

5. The rotary electric machine according to claim 1, wherein:

a center of the stator coil and the center of the permanent magnet are on the same line as viewed in the radial direction; and an end portion of the permanent magnet and the protrusion of the stator coil are overlapping as viewed in the radial direction.

6. The rotary electric machine according to claim 2, wherein the number of the first coils is six.

7. The rotary electric machine according to claim 1, wherein the stator coil includes six first coils and six second coils.

* * * * *